United States Patent [19]
Chiang

[11] Patent Number: 5,848,567
[45] Date of Patent: Dec. 15, 1998

[54] COOKING DEVICE HAVING A BASE UNIT WITH A SLIDABLY MOUNTED OIL ACCUMULATING TRAY FOR ACCUMULATING DRIPPING OIL

[76] Inventor: Hanh Chiang, No. 162, Chung-Chen S. Rd., Hsia-Jen Hsiang, Tainan Hsien, Taiwan

[21] Appl. No.: 98,847

[22] Filed: Jun. 17, 1998

[51] Int. Cl.[6] ................................................ A47J 37/06
[52] U.S. Cl. ................................ 99/375; 99/380; 99/400; 99/425; 99/446; 219/386; 219/521
[58] Field of Search .............................. 99/372, 375, 380, 99/400, 401, 447, 425, 445, 444, 446, 376–384, 373, 374; 219/401, 524, 525, 415, 521, 386, 461; 126/369, 20; 426/523

[56] References Cited

U.S. PATENT DOCUMENTS

| | | | |
|---|---|---|---|
| 2,321,676 | 6/1943 | Hennessy | 99/425 |
| 3,369,481 | 2/1968 | Pappas | 99/445 |
| 3,593,648 | 7/1971 | Walters | 99/349 |
| 3,664,256 | 5/1972 | Peirce | 99/425 |
| 3,719,507 | 3/1973 | Bardeau | 99/375 |
| 3,842,726 | 10/1974 | Fautz | 99/445 X |
| 4,034,663 | 7/1977 | Jenn et al. | 99/446 |
| 4,403,540 | 9/1983 | Erkelenz | 99/375 |
| 4,972,766 | 11/1990 | Anetsberger | 99/379 X |
| 5,606,905 | 3/1997 | Boehm et al. | 99/400 X |

*Primary Examiner*—Timothy F. Simone
*Attorney, Agent, or Firm*—Christie, Parker & Hale, LLP

[57] ABSTRACT

A cooking device includes a base unit, an upper unit hinged to the base unit along a pivot axis, an oil accumulating tray, and slidably retaining device. The base unit defines a horizontal plane, and has a lower cooking plate disposed at an angle relative to the horizontal plane, a plurality of grilling members mounted on the lower cooking plate in heat conducting relationship, and a bottom wall disposed underneath the lower cooking plate. The upper unit has an upper cooking plate disposed therein and movable relative to the lower cooking plate. The lower cooking plate inclines gradually and downwardly from a proximate position relative to the pivot axis toward a distal position, and is formed with a fluid outlet at the distal position to communicate the lower cooking plate with the bottom wall. The base unit further has a pair of engagement portions disposed on the bottom wall and spaced apart from each other in a parallel manner. The accumulating tray is disposed underneath the lower cooking plate and has two lateral side portions. The slidably retaining device is disposed between the engagement portions and the lateral side portions for slidably and removably retaining the tray such that oil dripping via the fluid outlet can be accumulated in the tray.

5 Claims, 5 Drawing Sheets

COOKING DEVICE HAVING A BASE UNIT WITH A SLIDABLY MOUNTED OIL ACCUMULATING TRAY FOR ACCUMULATING DRIPPING OIL

BACKGROUND OF THE INVENTION

1. Field of the Invention

The invention relates to a cooking device, more particularly to a cooking device having a base unit with a slidably mounted oil accumulating plate for accumulating dripping oil.

2. Description of the Related Art

Referring to FIGS. 1 and 2, a conventional cooking device is shown to include a lower housing half 4 and an upper housing half 3 hinged to the lower housing half 4 along a pivot axis 5.

As illustrated, the lower housing half 4 has a lower cooking plate 2 disposed at an angle relative to a horizontal plane thereof, and a plurality of parallel grilling members 8 disposed on the lower cooking plate 2 in heat conducting relationship. The upper housing half 3 has an upper cooking plate 1 disposed therein and movable relative to the lower cooking plate 2 to define a cooking chamber therebetween.

Note that the grilling members 8 are disposed in two columns to define a central channel 6 therebetween that extends in a direction transverse to the pivot axis 5. The lower cooking plate 2 has two parallel lateral sides 201 and a plate surface 7 which inclines gradually and downwardly from the lateral side 201 such that, when meat is grilled on the grilling members 8, dripping oil can be accumulated in the channel 6.

It is laborious to clean off the oil from the channel 6. It is more troublesome to clean residue left in the clearance 9 formed between an adjacent pair of the grilling members 8.

SUMMARY OF THE INVENTION

Therefore, the object of this invention is to provide a cooking device which obviates the disadvantages that are generally associated with the conventional cooking device.

Accordingly, the cooking device of this invention includes a base unit, an upper unit, an oil accumulating tray, and slidably retaining means. The base unit defines a horizontal plane, and has a lower cooking plate disposed at an angle relative to the horizontal plane, a plurality of grilling members mounted on the lower cooking plate in heat conducting relationship, and a bottom wall disposed underneath the lower cooking plate. The upper unit is hinged to the base unit along a pivot axis, and has an upper cooking plate disposed therein and movable relative to the lower cooking plate to define a cooking chamber therebetween. The lower cooking plate inclines gradually and downwardly from a proximate position relative to the pivot axis toward a distal position, and is formed with a fluid outlet disposed at the distal position to communicate the lower cooking plate with the bottom wall. The base unit further has a pair of engagement portions disposed on the bottom wall and spaced apart from each other in a parallel manner such that the engagement portions extend from the distal position to the proximate position. The accumulating tray is disposed underneath the lower cooking plate, and has two lateral side portions movably retained on the engagement portions. The slidably retaining means is disposed between the engagement portions and the lateral side portions of the oil accumulating tray for slidably and removably retaining the accumulating tray in such a manner that the oil dripping down from the lower cooking plate via the fluid outlet can be accumulated in the accumulating tray.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
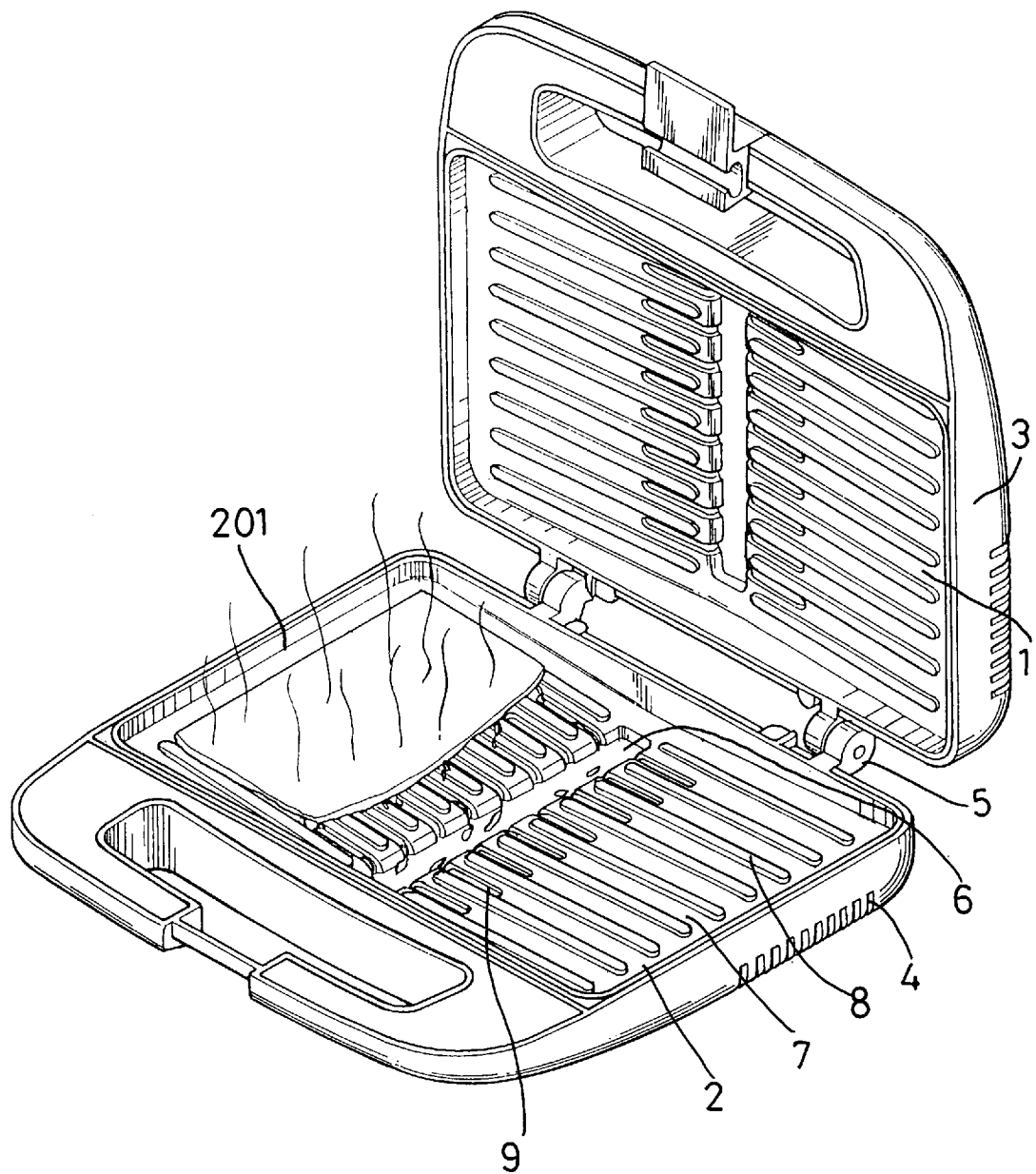
FIG. 1 is a perspective view of a conventional cooking device.
Figure 2:
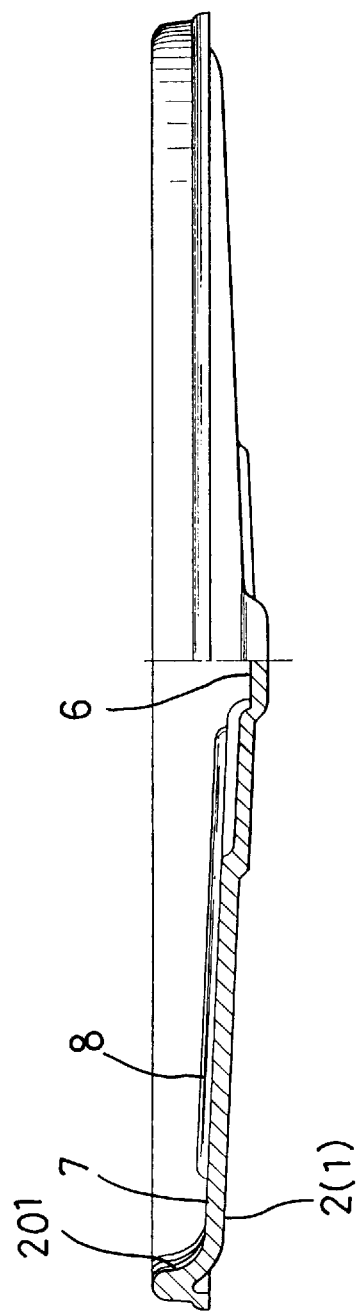
FIG. 2 is a partly sectional view of the conventional cooking device.
Figure 3:
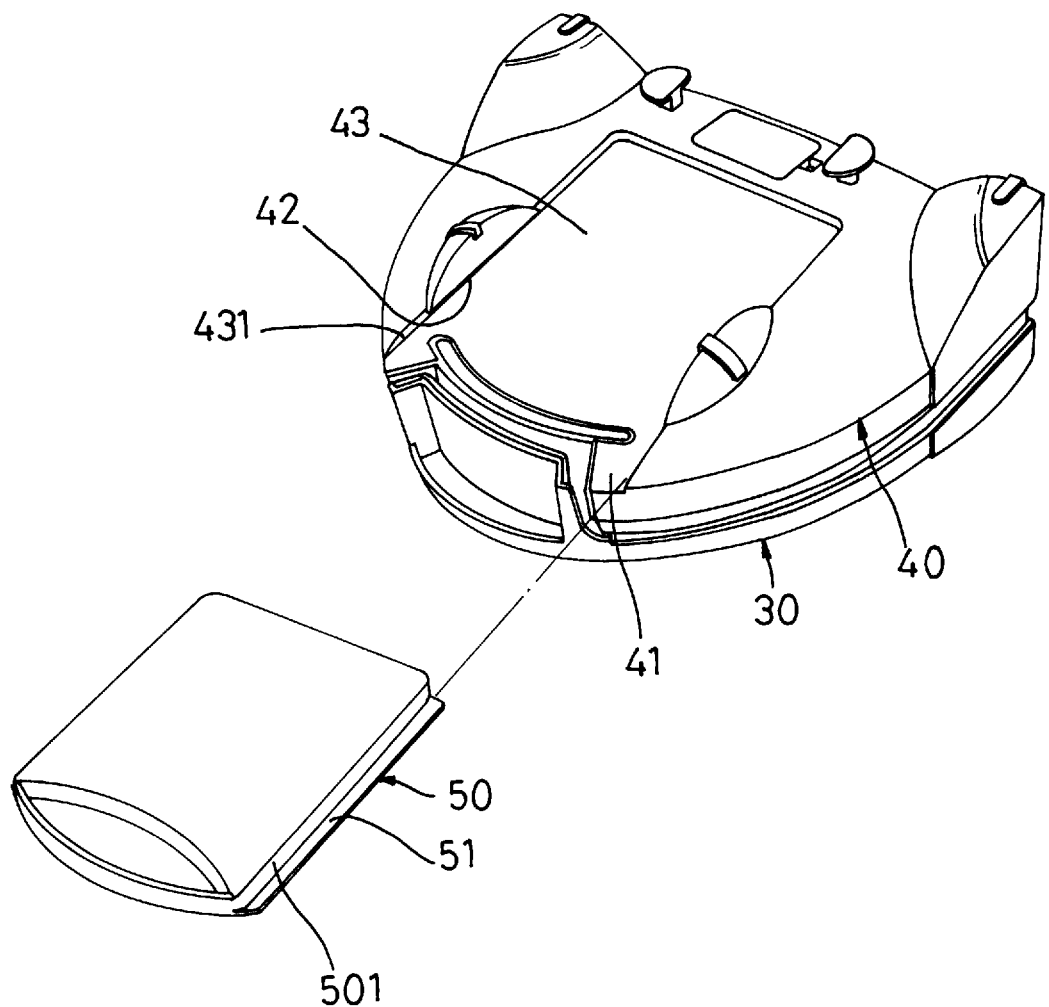
FIG. 3 is an upturned perspective view of the first preferred embodiment of this invention.
Figure 4:
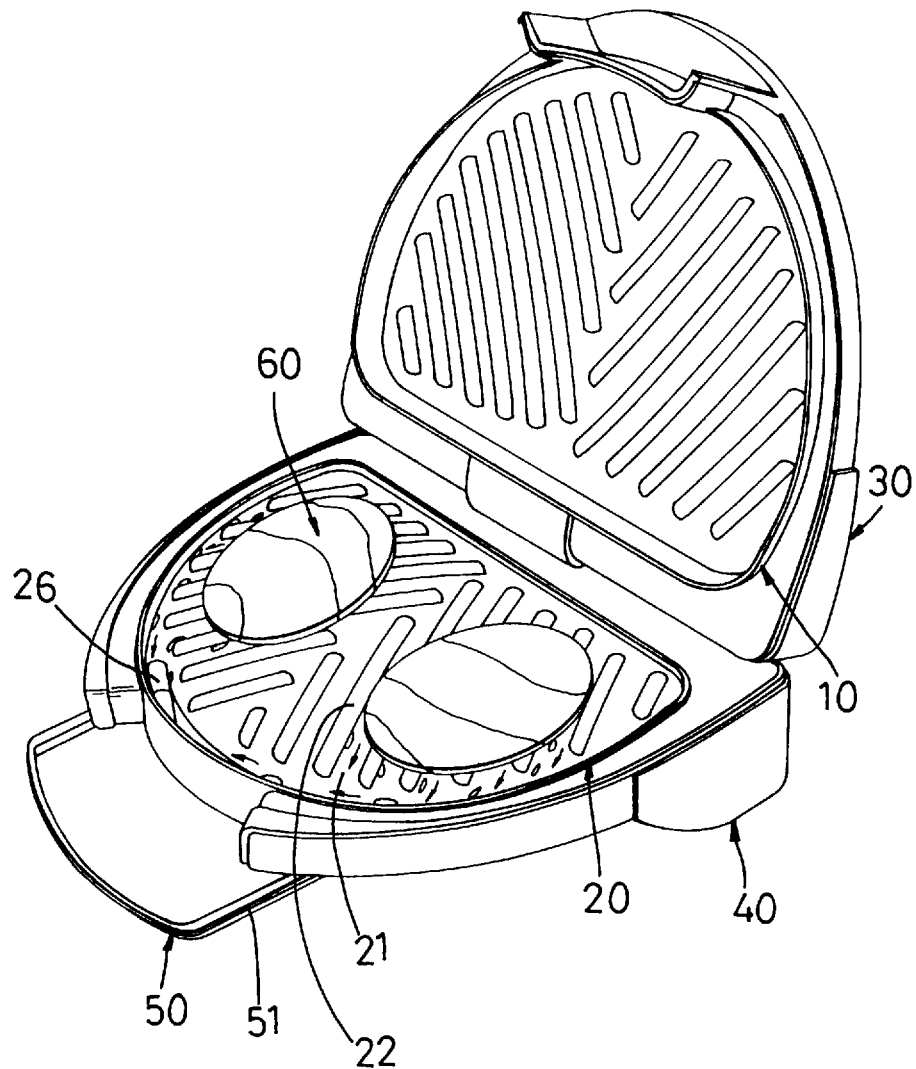
FIG. 4 is a perspective view of the first preferred embodiment.

Referring to FIGS. 3 and 4, the first preferred embodiment of a cooking device of this invention is shown to include a base unit 40, an upper unit 30, a generally rectangular oil accumulating tray 50, and slidably retaining means.

As illustrated, the base unit 40 defines a horizontal plane, and has a lower cooking plate 20 disposed at an angle relative to the horizontal plane, a plurality of grilling members 22 mounted on the lower cooking plate 20 in heat conducting relationship, and a bottom wall 41 (see FIG. 5) disposed underneath the lower cooking plate 20.

The upper unit 30 is hinged to the base unit 40 along a pivot axis, and has an upper cooking plate 10 disposed therein and movable relative to the lower cooking plate 20 to define a cooking chamber therebetween. The lower cooking plate 20 has a plate surface 21 that inclines gradually and downwardly from a proximate position relative to the pivot axis toward a distal position and that is formed with a fluid outlet 26 disposed at the distal position to communicate the lower cooking plate 20 with the bottom wall 41 so as to drain oil from the lower cooking plate 20 outwardly and downwardly of the bottom wall 41. The base unit 40 further has a pair of engagement portions 42 disposed on the bottom wall 41 and spaced apart from each other in a parallel manner such that the engagement portions 42 extend from the distal position to the proximate position.

The accumulating tray 50 is disposed underneath the lower cooking plate 20, and has two lateral side portions 501 movably retained on the engagement portions 42.

The slidably retaining means is disposed between the engagement portions 42 and the lateral side portions 501 of the accumulating tray 50 for slidably and removably retaining the accumulating tray 50 in such a manner that the oil dripping down from the lower cooking plate 20 via the fluid outlet 26 can be accumulated in the accumulating tray 50.

Figure 5:
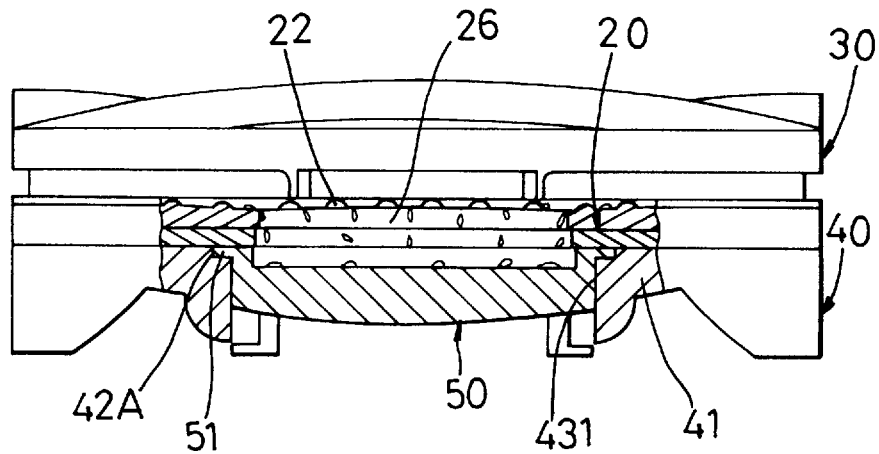
FIG. 5 is a partly sectional view of the first preferred embodiment.

Referring to FIGS. 3 and 5, the base unit 40 further defines a receiving cavity 43 indented upwardly and inwardly of the bottom wall 41 along the engagement portions 42 to form two upright abutment walls 431. The slidably retaining means includes a first pair of guide grooves 42A respectively disposed in and indented inwardly and horizontally of the upright abutment walls 431 so as to slidably retain the lateral side portions 501 of the accumulating tray 50.

Figure 6:
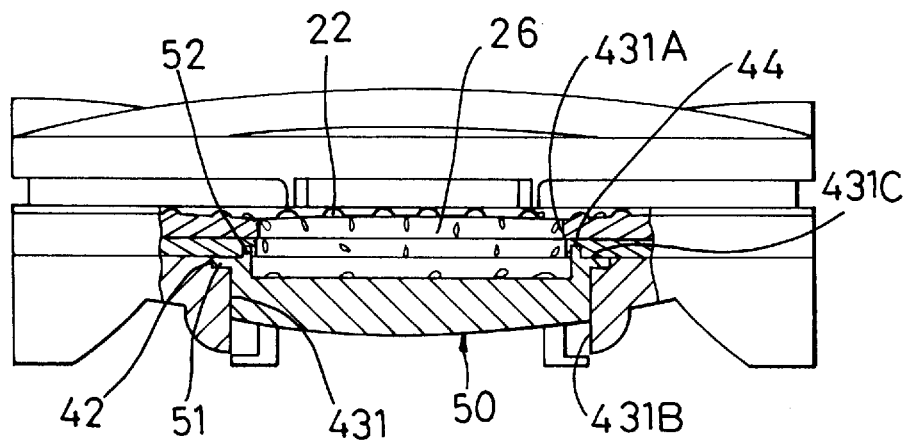
FIG. 6 is a partly sectional view of a modified preferred embodiment of this invention.

Referring to FIG. 6, in a modified preferred embodiment, the upright abutment walls 431 include a pair of spaced upper upright abutment wall sections 431A disposed proximate to the lower cooking plate 20 and defining a first distance therebetween, and a pair of spaced lower upright abutment wall sections 431B distal to the lower cooking plate 20 and defining a second distance therebetween. The first distance is shorter than the second distance so as to form a downwardly facing shoulder 431C between the upper and lower upright abutment wall sections 431A, 431B. The first pair of guide grooves 42A are indented inwardly and horizontally in the lower upright abutment wall sections 431B. The slidably retaining means further includes a first pair of guide flanges 51 (see FIG. 3) disposed on and extend outwardly from the lateral side portions 501 of the accumulating tray 50 so as to be slidably received in the first pair of guide grooves 42A. The slidably retaining means further includes a second pair of guide flanges 52 which extend uprightly from the lateral side portions 501 of the accumulating tray 50 and which are disposed inboard to the outward guide flanges 51 respectively, and a second pair of guide grooves 44 formed in the shoulder 431C inboard to the first pair of guide grooves 42A and extend from the distal position toward the proximate position to receive the upright guide flanges 52.

As explained, when meat 60 (see FIG. 4) is roasted in the cooking chamber, oil dripping from the lower cooking plate 20 via the fluid outlet 26 (see FIGS. 5 and 6) will be accumulated in the accumulating trays 50.

With this invention thus explained, it is apparent that numerous modifications and variations can be made without departing from the scope and spirit of this invention. It is therefore intended that this invention be limited only as indicated in the appended claims.

I claim:

1. A cooking device comprising:

a base unit defining a horizontal plane, and having a lower cooking plate disposed at an angle relative to the horizontal plane, a plurality of grilling members mounted on said lower cooking plate in heat conducting relationship, and a bottom wall disposed underneath said lower cooking plate;

an upper unit hinged to said base unit along a pivot axis, and having an upper cooking plate disposed therein and movable relative to said lower cooking plate to define a cooking chamber therebetween, wherein said lower cooking plate inclines gradually and downwardly from a proximate position relative to said pivot axis toward a distal position and is formed with a fluid outlet disposed at said distal position to communicate said lower cooking plate with said bottom wall so as to drain oil from said lower cooking plate outwardly and downwardly of said bottom wall;

said base unit further having a pair of engagement portions disposed on said bottom wall and spaced apart from each other in a parallel manner and extending from said distal position to said proximate position;

an oil accumulating tray disposed underneath said lower cooking plate, and having two lateral side portions movably retained on said engagement portions; and slidably retaining means disposed between said engagement portions and said lateral side portions of said oil accumulating tray for slidably and removably retaining said oil accumulating tray in such a manner that the oil dripping down from said lower cooking plate via said fluid outlet can be accumulated in said oil accumulating tray.

2. The cooking device as defined in claim 1, wherein said base unit defines a receiving cavity indented upwardly and inwardly of said bottom wall along said engagement portions to form two upright abutment walls, said slidably retaining means including a first pair of guide grooves respectively disposed in and indented inwardly and horizontally of said upright abutment walls so as to slidably retain said lateral side portions of said oil accumulating tray.

3. The cooking device as defined in claim 2, wherein said upright abutment walls include a pair of spaced upper upright abutment wall sections disposed proximate to said lower cooking plate and defining a first distance therebetween, and a pair of spaced lower upright abutment wall sections distal to said lower cooking plate and defining a second distance therebetween, said first distance being shorter than said second distance so as to form a downwardly facing shoulder between said upper and lower upright abutment wall sections, said first pair of guide grooves being indented inwardly and horizontally in said lower upright abutment wall sections.

4. The cooking device as defined in claim 3, wherein said slidably retaining means further includes a first pair of guide flanges disposed on and extending outwardly from said lateral side portions of said oil accumulating tray so as to be slidably received in said first pair of guide grooves.

5. The cooking device as defined in claim 4, wherein said slidably retaining means further includes a second pair of guide flanges extending uprightly from said lateral side portions of said oil accumulating tray so as to be disposed inboard to said first pair of guide flanges respectively, and a second pair of guide grooves formed in said shoulder inboard to said first pair of guide grooves and extending from said distal position toward said proximate position to receive said upright guide flanges.

* * * * *